US012119161B2

(12) United States Patent
Song et al.

(10) Patent No.: US 12,119,161 B2
(45) Date of Patent: Oct. 15, 2024

(54) HIGH-DENSITY SINGLE-TURN INDUCTOR

(71) Applicant: Virginia Tech Intellectual Properties, Inc., Blacksburg, VA (US)

(72) Inventors: He Song, Vienna, VA (US); Jun Wang, Arlington, VA (US); Yue Xu, Cedar Park, TX (US); Rolando Burgos, Blacksburg, VA (US); Dushan Boroyevich, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 654 days.

(21) Appl. No.: 16/865,730

(22) Filed: May 4, 2020

(65) Prior Publication Data

US 2021/0343467 A1 Nov. 4, 2021

(51) Int. Cl.
*H01F 17/04* (2006.01)
*H01F 3/14* (2006.01)
(Continued)

(52) U.S. Cl.
CPC ........... *H01F 27/2823* (2013.01); *H01F 3/14* (2013.01); *H01F 17/04* (2013.01); *H01F 27/085* (2013.01);
(Continued)

(58) Field of Classification Search
CPC ........ H01F 27/2823; H01F 3/14; H01F 17/04; H01F 27/085; H01F 27/2885; H01F 27/324; H01F 27/36
See application file for complete search history.

(56) References Cited

U.S. PATENT DOCUMENTS

2004/0104798 A1* 6/2004 Cern ........................ H01F 38/28 340/310.17
2013/0069739 A1* 3/2013 Podell ........................ H01P 5/12 333/127

FOREIGN PATENT DOCUMENTS

| | | | | |
|---|---|---|---|---|
| CA | 2255772 | A1 | * | 12/1997 |
| CN | 203365666 | U | * | 12/2013 |
| JP | 11-234934 | | * | 8/1999 |

OTHER PUBLICATIONS

Song, He, et al. "A High-Density Single-Turn Inductor for a 6 kV SiC-based Power Electronics Building Block." 2020 IEEE Applied Power Electronics Conference and Exposition (APEC). IEEE, 2020.
(Continued)

*Primary Examiner* — Tuyen T Nguyen
(74) *Attorney, Agent, or Firm* — Thomas | Horstemeyer, LLP

(57) ABSTRACT

An inductor having a coaxial structure is described. In one example, the structure of the single-turn inductor can include a conductor, an insulation layer, a shielding layer, and a magnetic core. An air duct can be located between the shielding layer and the magnetic core. The shielding layer and the magnetic core can both be connected to a ground. In one example, the single-turn inductor can include a single-layer termination structure formed on terminations of the shielding layer. In another example, the single-turn inductor can include a double-layer termination structure formed on terminations of the shielding layer. Displacement current in the single-turn inductor can be reduced using, for example, lumped equivalent circuit models, a semi-conductive shielding layer model, or a resistive layer and conductive shielding layer model.

7 Claims, 15 Drawing Sheets

(51) Int. Cl.
*H01F 27/08* (2006.01)
*H01F 27/28* (2006.01)
*H01F 27/32* (2006.01)
*H01F 27/36* (2006.01)

(52) U.S. Cl.
CPC ....... *H01F 27/2885* (2013.01); *H01F 27/324* (2013.01); *H01F 27/36* (2013.01)

(56) References Cited

OTHER PUBLICATIONS

Cvetkovic, Igor, et al. "Modular scalable medium-voltage impedance measurement unit using 10 kV SiC MOSFET PEBBs." 2015 IEEE Electric Ship Technologies Symposium (ESTS). IEEE, 2015.
Chen, Wu, et al. "Analysis and comparison of medium voltage high power DC/DC converters for offshore wind energy systems." IEEE Transactions on Power Electronics 28.4 (2012): 2014-2023.
Macken, K. J. P., et al. "IGBT PEBB technology for future high energy physics machine operation applications." 2011 Twenty-Sixth Annual IEEE Applied Power Electronics Conference and Exposition (APEC). IEEE, 2011.
Lai, Jih-Sheng; et al. "Energy management power converters in hybrid electric and fuel cell vehicles." Proceedings of the IEEE 95.4 (2007): 766-777.
Wang, Jun, et al. "Power electronics building block (pebb) design based on 1.7 kv sic mosfet modules." 2017 IEEE Electric Ship Technologies Symposium (ESTS). IEEE, 2017.
Wang, Jun, et al. "Design and testing of 1 kV H-bridge power electronics building block based on 1.7 kV SiC MOSFET module." 2018 International Power Electronics Conference (IPEC—Niigata 2018—ECCE Asia). IEEE, 2018.
Solero, Luca, et al. "Design of resonant circuit for zero-current-transition techniques in 100-kW PEBB applications." IEEE transactions on industry applications 39.6 (2003): 1783-1794.
Banerjee, Sarajit; et al. "Thermal effects of high-frequency voltage on medium voltage cable terminations." 2007 IEEE International Conference on Solid Dielectrics. IEEE, 2007.
Paulsson, Lars, et al. "High-frequency impacts in a converter-based back-to-back tie; the Eagle Pass installation." IEEE Transactions on Power Delivery 18.4 (2003): 1410-1415.
Bengtsson, Tord, et al. "Repetitive fast voltage stresses-causes and effects." IEEE Electrical Insulation Magazine 25.4 (2009): 26-39.
Luo, Fang, et al. "Design of a hybrid busbar filter combining a transmission-line busbar filter and a one-turn inductor for DC-fed three-phase motor drive systems." IEEE transactions on Power Electronics 28.12 (2013): 5588-5602.
Guillod, Thomas; et al. "Electrical shielding of MV/MF transformers subjected to high dv/dt PWM voltages." 2017 IEEE Applied Power Electronics Conference and Exposition (APEC). IEEE, 2017.
Espino-Cortes, Fermin Pascual; et al. "Stress grading materials for cable terminations under fast-rise time pulses." IEEE transactions on dielectrics and electrical insulation 13.2 (2006): 430-435.

* cited by examiner

HIGH-DENSITY SINGLE-TURN INDUCTOR

STATEMENT REGARDING FEDERALLY SPONSORED RESEARCH OR DEVELOPMENT

This invention was made with government support under DE-AR0000892 awarded by the U.S. Department of Energy, and N00014-16-1-2956 awarded by the Office of Naval Research. The government has certain rights in the invention.

BACKGROUND

An inductor is a passive electrical element or component that stores energy in the form of a magnetic field as electric current flows through the inductor. The magnetic field is formed when current flows through the inductor, and the magnetic field induces a voltage across the inductor. The voltage opposes any change in the current that created the voltage. Thus, inductors oppose changes in current that flow through them. Among other attributes, an inductor is characterized by its inductance, which is defined as a ratio of the inducted voltage across the inductor to the rate of change of current through the inductor. Inductors are one of the three passive linear circuit elements that make up electronic circuits, along with resistors and capacitors.

Various types of inductors are manufactured for a wide range of purposes. Inductors are typically formed to include a coil of conducting material, such as insulated copper wire, wrapped around a core. The core of an inductor can be formed of air or other materials, such as ferromagnetic material.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
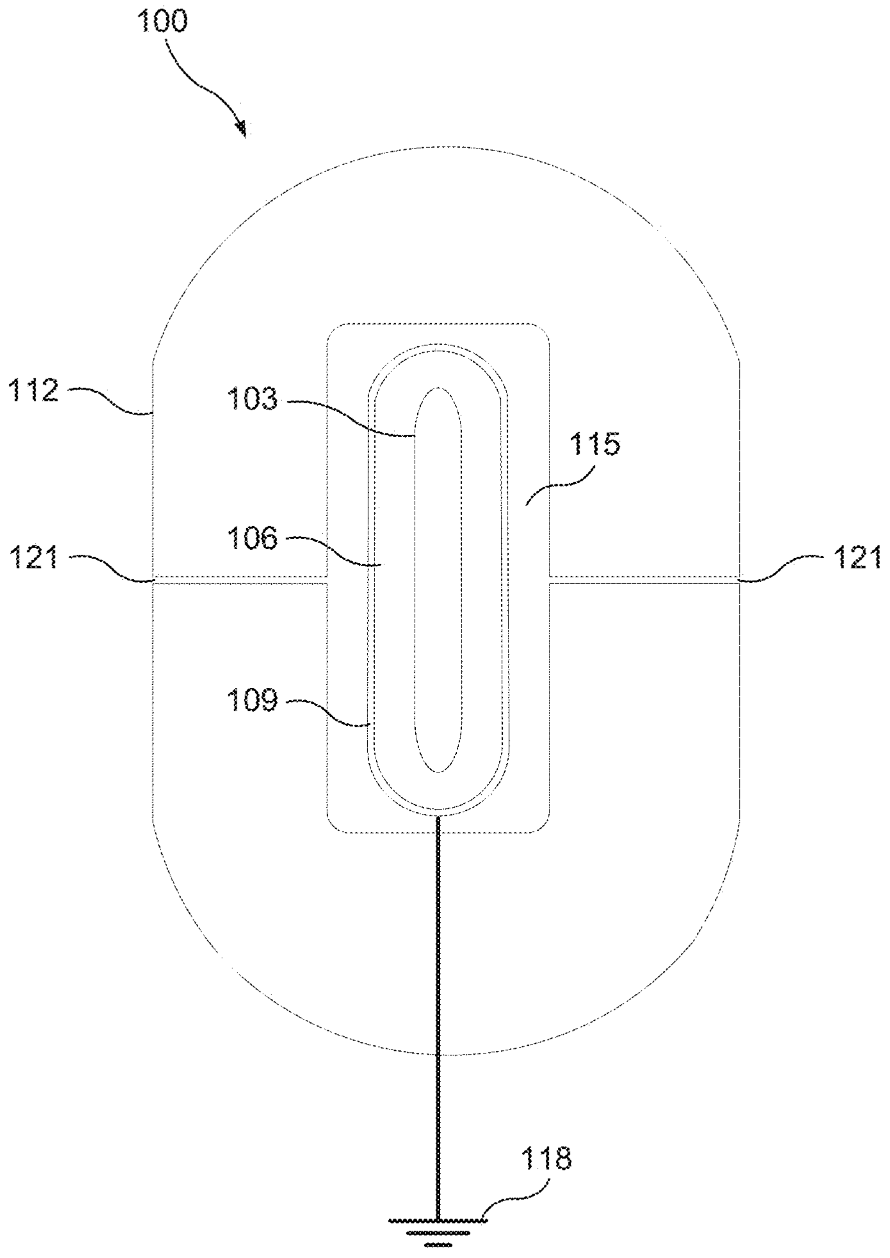
FIG. 1 illustrates an example of a cross-sectional view of a single-turn inductor according to various embodiments of the present disclosure.

There is a need for an inductor that can operate under medium-voltage and high-current conditions with fast switching transients for high-power density Silicon Carbide (SiC)-based power electronics building blocks of modular converters. Yet, the conventional inductors currently used in these medium-voltage applications are relatively large in volume. In fact, in some cases, the size of the inductor even dominates the entire converter. That is because medium-voltage inductors often have bulky electrical insulation systems, which can increase the overall size of the inductor. While converters with high switching frequencies have managed to reduce the necessary inductance value, the resulting bulky insulation design is a major barrier to realizing the high power density requirements of the power electronics building blocks. Inductors with compact insulation systems are desirable, in any case, for high power density requirements. Inductors with relatively small volume have been proposed, but these inductors are rated for lower voltages and would have to be larger if used in higher-voltage applications. Thus, there is an emerging need for a more compact and scalable insulation system for medium-voltage, high-frequency inductors. For medium-voltage applications, it is important for the insulation system to be properly designed to avoid insulation failure. The type of insulation used can also affect both the size and the efficacy of the inductor. The insulation system used should therefore optimize these characteristics with minimal side effects.

Conventional inductor designs may use air as insulation. For example, many such designs use an all-air insulation structure with an unshielded cable or a solid-air insulation structure with a conductor and a solid insulator without a shielding layer. But the insulation properties of air are unstable and can be easily influenced by temperature, humidity, air pressure, and other environmental factors. And, at higher voltage levels, much more air space is needed, which results in an inductor that is larger in volume. Air insulation is therefore not desirable.

There are several possible options for insulation systems that do not use air insulation. One option involves impregnating the whole structure of the inductor—including the conductor and the magnetic core—into a solid insulator. But at higher currents, significant core loss and winding loss can occur. The structure can cause poor thermal performance, so this design is not an optimal choice.

Another option is a single-turn inductor used as an electromagnetic interference filter embedded in a printed circuit board. But because this design is intended for low voltage applications, it has no specific insulation system. If this design were used for medium-voltage applications, much more space would be needed to accommodate a proper insulation system. This would mean an inductor that is larger in volume that would not be able to meet the power density requirements of the power electronics building blocks, so this design is not viable for medium-voltage applications.

A single-turn inductor also used as an arm inductor in a 1 kV converter can, however, be used in medium-voltage applications. The arm-inductor design uses epoxy to fill the air duct between a metal connector and a magnetic core around the metal connector. This design is not reliable, though, because a significant number of air bubbles may be present in the insulation system after the epoxy is cured. Partial discharge can occur in these air bubbles at relatively low voltages, which quickly degrades the surrounding insulation. The size of the insulation system could be significantly increased to avoid these partial discharges, but an inductor of this size would not meet the power density requirements of the power electronics building block. This is especially true in high-voltage applications. The arm-inductor design also has poor cooling performance because of the low thermal conductivity of epoxy. An arm-inductor design using epoxy insulation is therefore not an optimal solution.

The concepts described herein address these issues using single-turn inductor with a shielded winding structure. The components of the inductor can be arranged in a coaxial structure. The single-turn inductor design can include a shielding termination structure to reduce electric field stress at the terminations of the shielding. The single-turn inductor design can also employ one of several displacement current reduction methods that allow the inductor to better operate under a harsh switching transient.

This single-turn inductor design is compact and can be used in medium-voltage, high-power, fast-switching-transient applications where high power density is needed. This design is also scalable to any voltage level and dV/dt level. The single-turn inductor design has a low inductance and can be used to limit circulating current between converters. Possible applications for the single-turn inductor design include, for example, electric ships, motor drives for underground mining, medium-voltage direct current distribution systems, wind turbine converters, and other similar applications.

FIG. 1 illustrates an example of a cross-sectional view of a single-turn inductor 100 according to various embodiments of the present disclosure. The single-turn inductor 100 is illustrated as a representative example in FIG. 1. The single-turn inductor 100 is not drawn to scale in FIG. 1, and the single-turn inductor 100 can include other features or components not explicitly shown in FIG. 1. The single-turn inductor 100 can also omit one or more of the features or components shown in FIG. 1 in some cases.

The single-turn inductor 100 includes a conductor 103, an insulation layer 106, a shielding layer 109, and a magnetic core 112 arranged in a coaxial structure. An air duct 115 can be located between the shielding layer 109 and the magnetic core 112. The shielding layer 109 and the magnetic core 112 can each be connected to a ground 118, which can be, for example, a single-point grounding. The magnetic core can include one or more air gaps 121.

The conductor 103 is located substantially at the center of the cross-sectional view of the single-turn inductor 100 shown in FIG. 1. The conductor 103 can have rounded corners to avoid causing electric field crowding in the insulation layer 106. In some examples, the conductor 103 can be a copper bar, which can be useful for lower-frequency applications and can help with straightforward fabrication. In other examples, the conductor 103 can be Litz wire, which can lower winding loss in higher-frequency applications. And in other examples, the conductor 103 can be a copper bread braid, which can be more mechanically flexible.

The insulation layer 106 can be formed around the conductor 103 so that the insulation layer 106 encloses or otherwise surrounds all or part of the conductor 103. The insulation layer 106 can be a solid insulator or other suitable insulator. The dielectric strength of the insulation layer 106 can be several times greater than air. In some examples, the insulator material used to form the insulation layer 106 can comprise an insulating tape such as a mica tape. The mica tape can be a resin-rich mica tape that can include a mica frame that is saturated with a resin or other epoxy. The mica tape can undergo a curing process that includes hot-pressing and oven-curing. The resin or other epoxy can become liquid during the curing process and then become solid once it cools. The electric field distribution in the insulation layer 106 can be used to determine a sufficient thickness for the insulation layer 106. The thickness of the insulation layer 106 can be adjusted by applying more or less of the insulator to the conductor 103. In examples where the insulation layer 106 is an insulating tape, more or fewer tape layers can be wrapped around the conductor 103 to adjust the thickness of the insulation layer 106.

The shielding layer 109 can be formed around the insulation layer 106 so that the shielding layer 109 encloses or otherwise surrounds all or part of the insulation layer 106 and the conductor 103. As an example, the shielding layer 109 can comprise a silver-coated copper conductive coating. In some embodiments, the silver-coated copper conductive coating or other material can be in the form of an aerosol before being sprayed on an outer surface of the insulation layer 106 to form the shielding layer 109. The shielding layer 109 can confine the concentrated electric field that would otherwise be present in the air duct 115. Because of a voltage drop across the conductor 103 to the shielding layer 109, negligible electric field will exist in the air duct 115.

Magnetic flux leakage at the air gap 121 can, however, introduce eddy current loss on the shielding layer 109. This extra loss on the shielding layer 109 may become a concern especially in high-frequency applications. Finite element analysis simulations show that the loss is a function of both a thickness of the shielding layer 109 and material electrical conductivity. In applications where loss is a significant concern, the thickness of the shielding layer 109 can be altered by, for example, designing the shielding layer 109 with different coating materials to reduce the loss to acceptable levels. In some examples, the entire core loss and winding loss can exceed about 100 W. An additional loss of about 5 W on the shielding layer 109 may therefore be acceptable for the entire single-turn inductor 100.

The magnetic core 112 can enclose or otherwise surround all or part of the shielding layer 109, the insulation layer 106, and the conductor 103. The magnetic core 112 can include one or more air gaps 121. The air duct 115 can be located between the magnetic core 112 and the shielding layer 109. The magnetic core 112 directs magnetic flux in the single-turn inductor 100. And, like the shielding layer 109, the magnetic core 112 can be connected to the ground 118, so the magnetic core 112 can have the same ground potential as the shielding layer 109. As noted above, this produces negligible electric field in the air duct 115. Indeed, regardless of its size, the air duct 115 may not sustain electric field stress. Thus, the air duct 115 can be used for cooling rather than insulation.

Table I, below, identifies example specifications for the single-turn inductor 100, as shown in FIG. 1. As an alternative, the specifications of single-turn inductors 100 formed according to the concepts described herein may vary. For example, compared to the specifications in Table I, a single-turn inductor 100 may have a larger or smaller inductance, may be rated for higher or lower currents, may be rated for higher or lower voltages, or may be suitable for frequencies beyond the given range.

TABLE I

| Parameter | Value |
|---|---|
| Inductance | 1 μH × 2 |
| Rated current | root mean squared: 126 A<br>maximum: 484 A |
| Rated voltage | DM: 6 kV<br>CM: ±3 kV |
| Partial discharge inception voltage | ±6 kV |
| dv/dt | Up to 100 V/ns |
| Switching frequency | Up to 40 kHz |

Figure 2A:
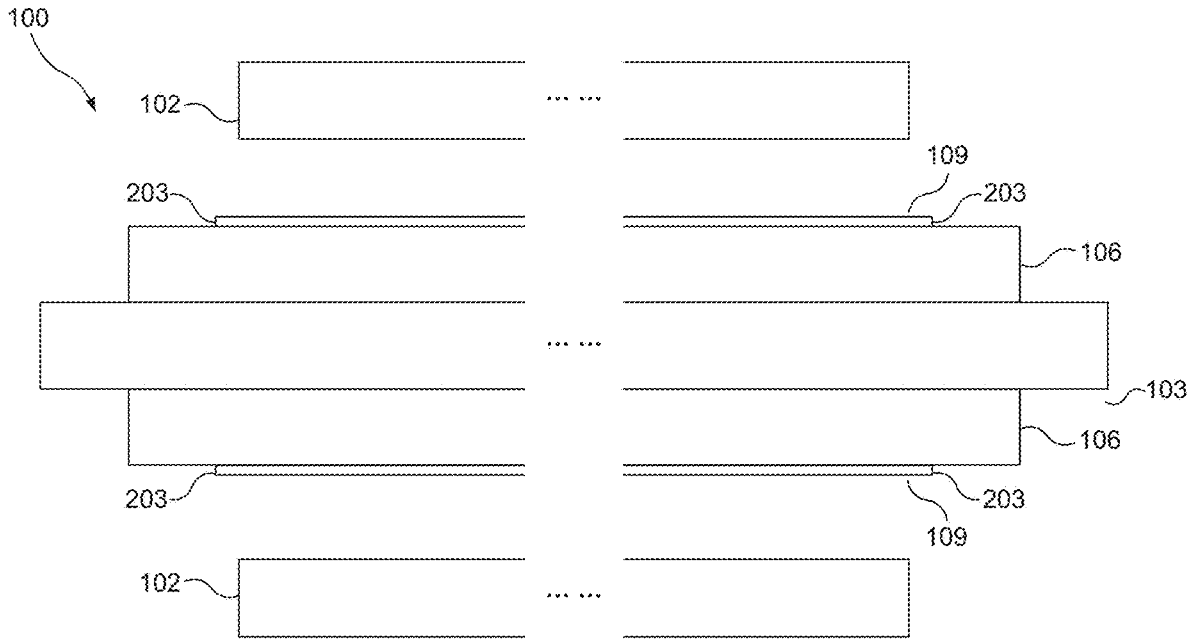
FIG. 2A illustrates an example of a subsection of a single-turn inductor according to various embodiments of the present disclosure.

FIG. 2A illustrates an example subsection of the single-turn inductor 100, including portions of the conductor 103, the insulation layer 106, and the shielding layer 109. Also shown are terminations 203A and 203B (alternatively "termination 203") of the shielding layer 109. The terminations 203A and 203B are at the edges of the shielding layer 109, where the shielding layer 109 ends. Past the terminations 203A and 203B, the distal ends of the insulation layer 106 are uncovered by the shielding layer 109 as shown in FIG. 2A.

Figure 2B:
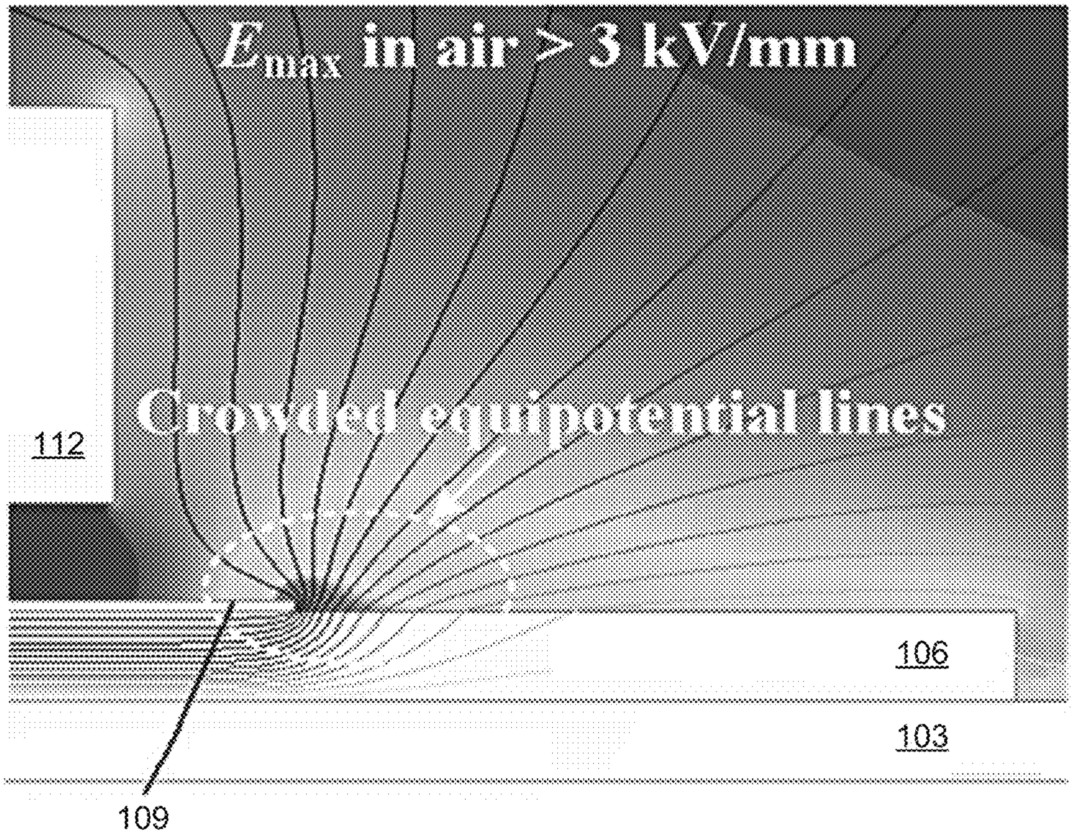
FIG. 2B illustrates an example of equipotential lines in an air duct surrounding a termination of a shielding layer shown in FIG. 2A according to various embodiments of the present disclosure.

FIG. 2B illustrates an example of equipotential lines in the air duct 115 surrounding a termination 203 of the shielding layer 109. These equipotential lines show the electric field intensity in the air duct 115. The equipotential lines are crowded at the termination 203 because of high electric field stress caused by the termination 203. To handle the high electric field stress, a termination structure can be formed on the termination 203 to cause the crowded equipotential lines to diverge.

Figure 3A:
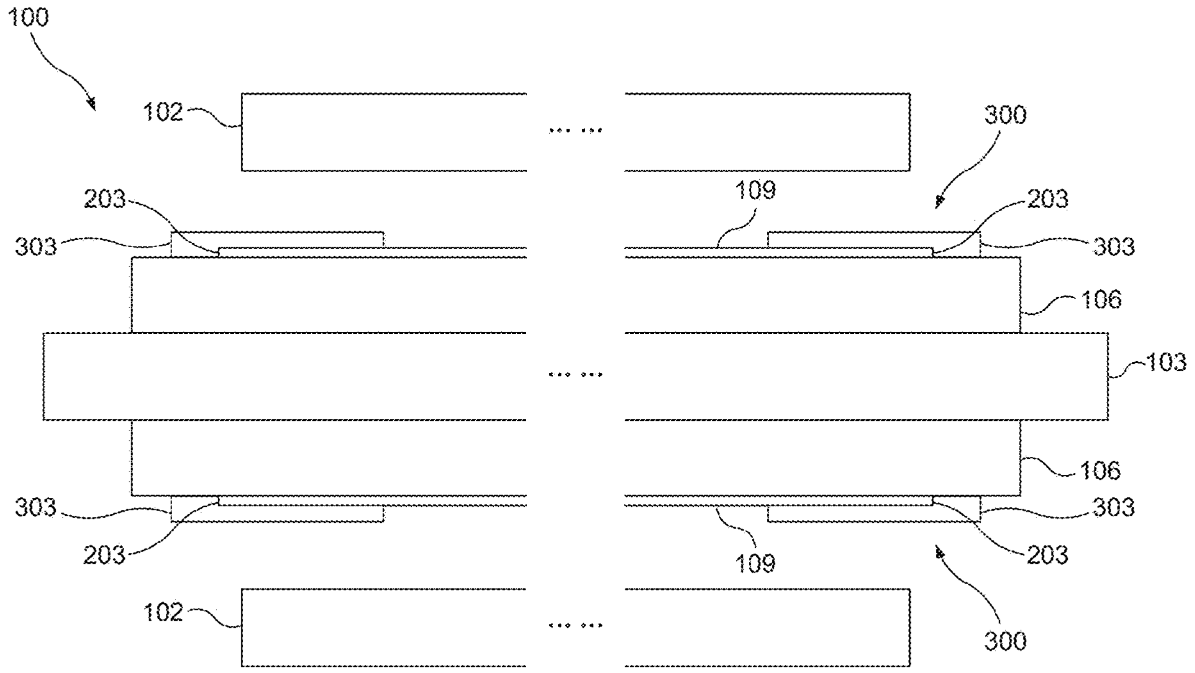
FIG. 3A illustrates another example of a subsection of a single-turn inductor that includes a single-layer termination structure according to various embodiments of the present disclosure.

FIG. 3A illustrates another example of a subsection of the single-turn inductor 100 including a single-layer termination structure 300. The single-layer termination structure 300 can include a stress control layer 303A and 303B (alternatively "stress control layer 303") formed on the terminations 203A and 203B, respectively, of the shielding layer 109, as well as on at least a portion of the insulation layer 106. The stress control layer 303 can comprise a material with a high relative permittivity. The material used for the stress control layer 303 can, for example, be an electrical stress control tape. The desired thickness and length of the stress control layer 303 can be determined using finite element analysis simulations, empirically, or other suitable techniques.

Figure 3B:
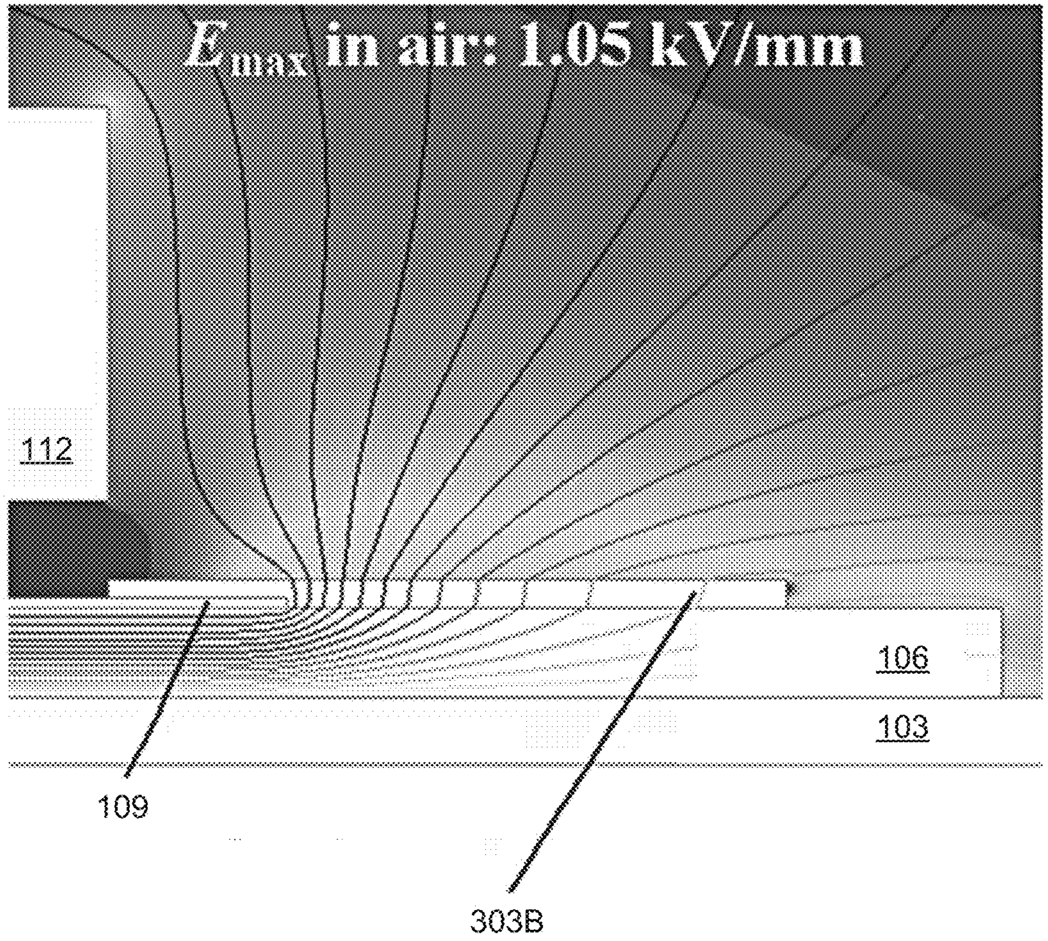
FIG. 3B illustrates an example of equipotential lines in the air duct surrounding the single-layer termination structure shown in FIG. 3A according to various embodiments of the present disclosure.

FIG. 3B illustrates an example of the equipotential lines in the air duct 115 surrounding the stress control layer 303B of the single-layer termination structure 300. The high-permittivity stress control layer 303B can cause the crowded equipotential lines shown in FIG. 2B to diverge. The divergence of these equipotential lines results in a lower electric field intensity in the air duct 115.

Figure 4A:
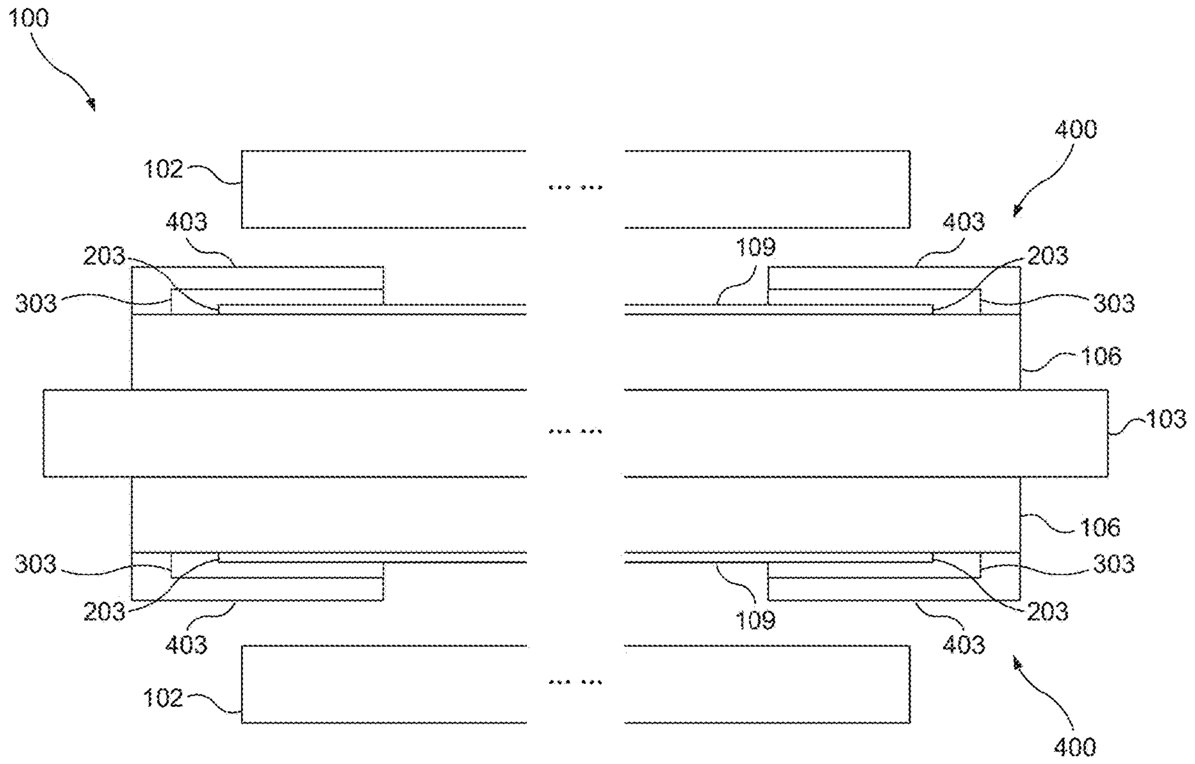
FIG. 4A illustrates another example of a subsection of a single-turn inductor that includes a double-layer termination structure according to various embodiments of the present disclosure.

FIG. 4A illustrates another example of a subsection of the single-turn inductor 100 that includes a double-layer termination structure 400. The double-layer termination structure 400 can be used at higher applied voltages. The double-layer termination structure 400 includes an additional insulation layer 403A and 403B (alternatively "additional insulation layer 403") formed on the stress control layer 303A and 303B, as well as on at least a portion of the insulation layer 106. The additional insulation layer 403 can comprise a material with a low relative permittivity. The material used for the additional insulation layer 403 can be, for example, a rubber mastic tape. Like the stress control layer 303, the desired thickness and length of the additional insulation layer 403 can be determined using finite element analysis simulations, empirically, or other suitable techniques. And, in addition to further lowering the electric field intensity in the air duct 115, the additional insulation layer 403 can prevent surface flashover and protect the stress control layer 303.

Figure 4B:
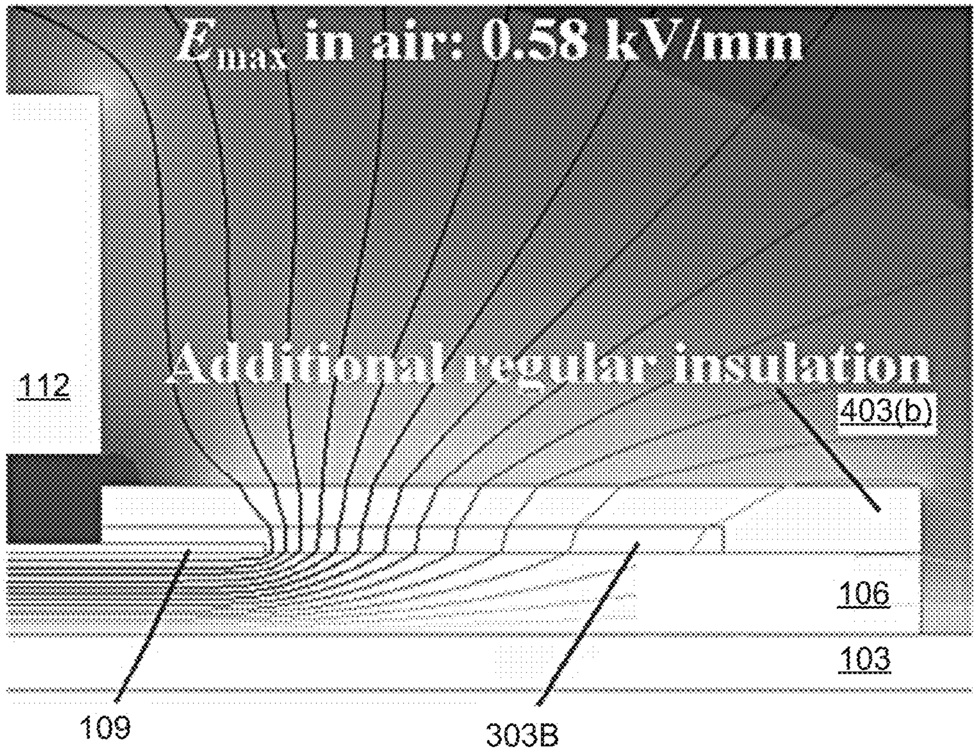
FIG. 4B illustrates an example of equipotential lines in the air duct surrounding the double-layer termination structure shown in FIG. 4A, according to various embodiments of the present disclosure.

FIG. 4B illustrates an example of the equipotential lines in the air duct 115 surrounding the stress control layer 303 and the additional insulation layer 403 of the double-layer termination structure 400. The equipotential lines are further diverged compared to the equipotential lines shown in FIGS. 2B and 3B, so the electric field intensity in the air duct 115 is further decreased.

Figure 5A:
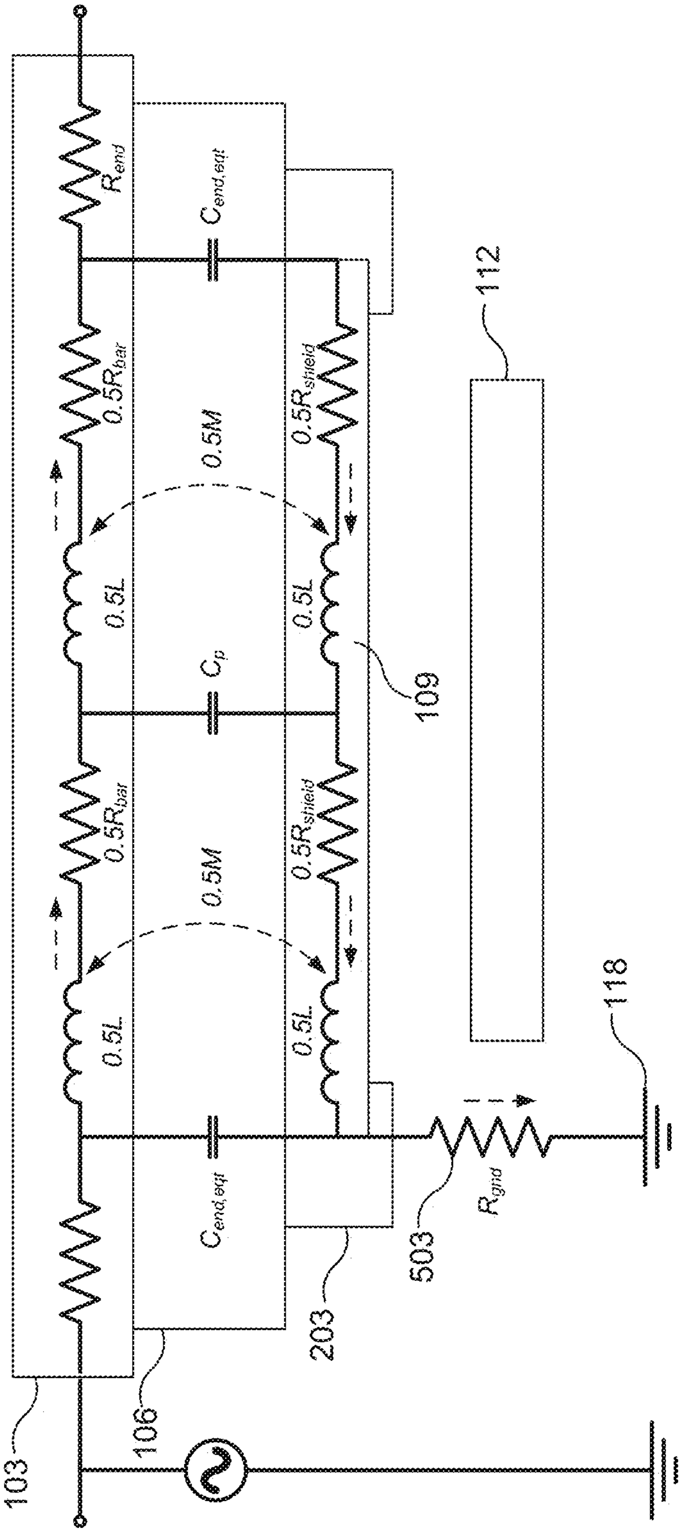
FIGS. 5A and 5B illustrate examples of an approach for reducing displacement current in a single-turn inductor that uses lumped equivalent circuit models, according to various embodiments of the present disclosure.
Figure 5B:
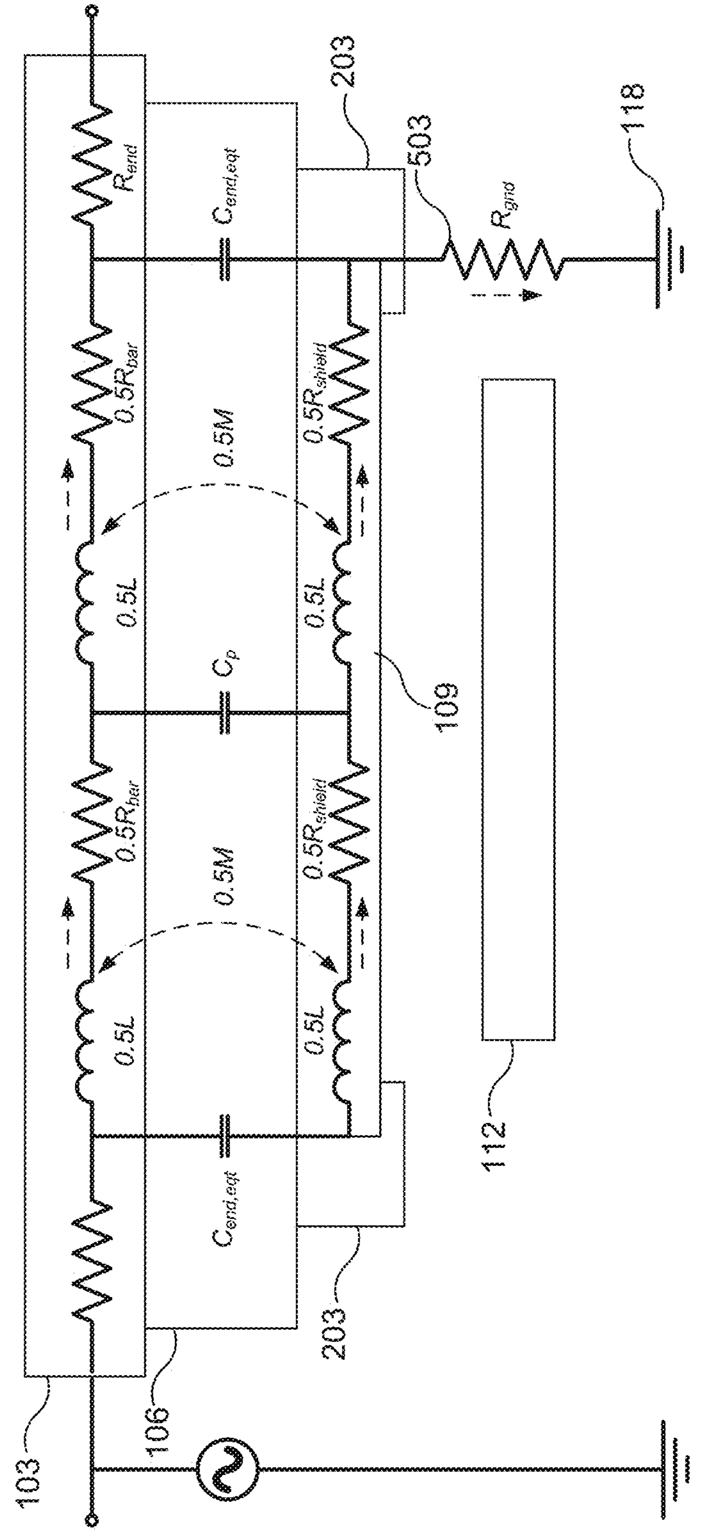

FIGS. 5A and 5B illustrate examples of an approach for reducing displacement current in the single-turn inductor 100 using lumped equivalent circuit models. The shielded winding structure of the single-turn inductor 100 can result in a parasitic capacitance between the conductor 103 and the shielding layer 109. Given a harsh switching transient, this parasitic capacitance can produce a substantial displacement current to the ground 118.

An external resistor 503 can be connected to the grounding path of the single-turn inductor 100 to reduce displacement current. The external resistor 503 can be, for example, a grounding resistor or a damping resistor. The external resistor 503 can be used to damp the displacement current caused by the parasitic capacitance between the conductor 103 and the shielding layer 109. While the external resistor 503 may in some examples cause extra loss and an induced voltage on the shielding layer 109, this is an acceptable trade-off.

The external resistor 503 can be connected to the grounding path of the single-turn inductor 100 at either a same side or an opposite side of the single-turn inductor 100 as the source of the displacement current. FIG. 5A shows a same-side grounding model in which the external resistor 503 can be connected to the grounding path on the same side as the source of the displacement current. In the same-side grounding model, the winding and shielding currents are negatively coupled.

FIG. 5B shows an opposite-side grounding model in which the external resistor 503 can be connected to the grounding path on the opposite side as the source of the displacement current. In the opposite-side grounding mode, the winding and shielding currents are positively coupled. In some examples, using one of these two grounding models can result in an acceptable input impedance up to a knee frequency of the switching transient signal.

Figure 6A:
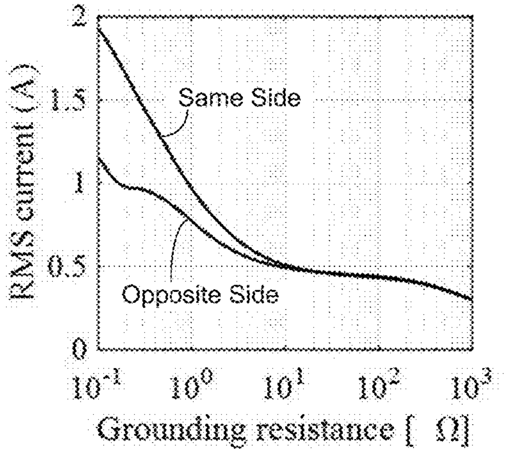
FIGS. 6A-6D illustrate examples of results of an equivalent circuit simulation for the lumped equivalent circuit models shown in FIGS. 5A and 5B, according to various embodiments of the present disclosure.
Figure 6B:
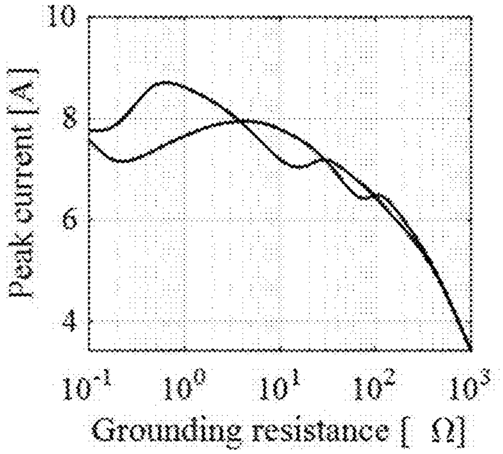
Figure 6C:
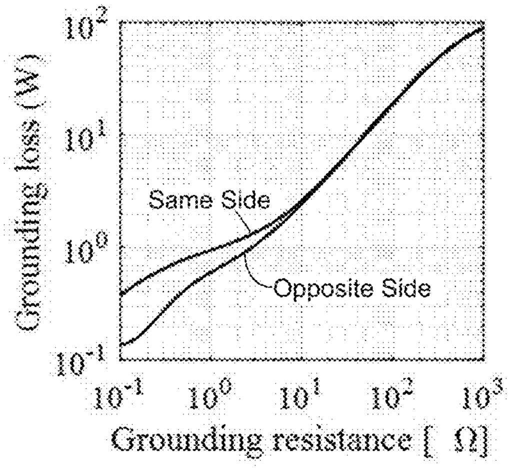
Figure 6D:
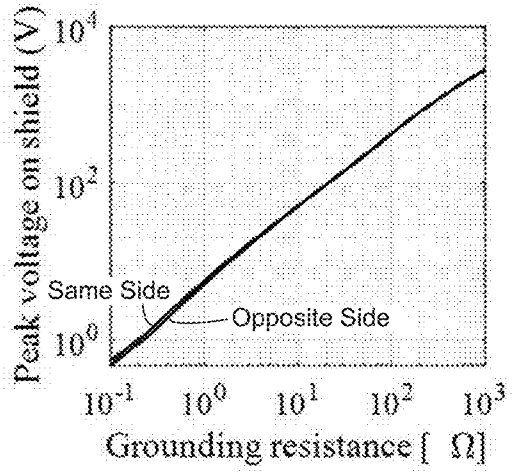

FIGS. 6A-6D illustrate examples of an equivalent circuit simulation results for the same-side grounding model shown in FIG. 5A and the opposite-side grounding model shown in FIG. 5B. FIGS. 6A and 6B, respectively, show the root-mean-squared current and the peak current through the grounding path, measured in amps. FIG. 6C shows the grounding loss on the external resistor 503 in ohms, and FIG. 6D shows the voltage on the shielding layer 109 in volts. In some examples, it may be desirable for the root-mean-squared current and the peak current through the grounding path to be kept low. At the same time, the voltage on the shielding layer 109 and the grounding loss on the external resistor 503 may not be desirable at all. Thus, one of the two grounding models in FIGS. 5A and 5B can be chosen based on which model has an optimal trade-off among these parameters.

Figure 7:
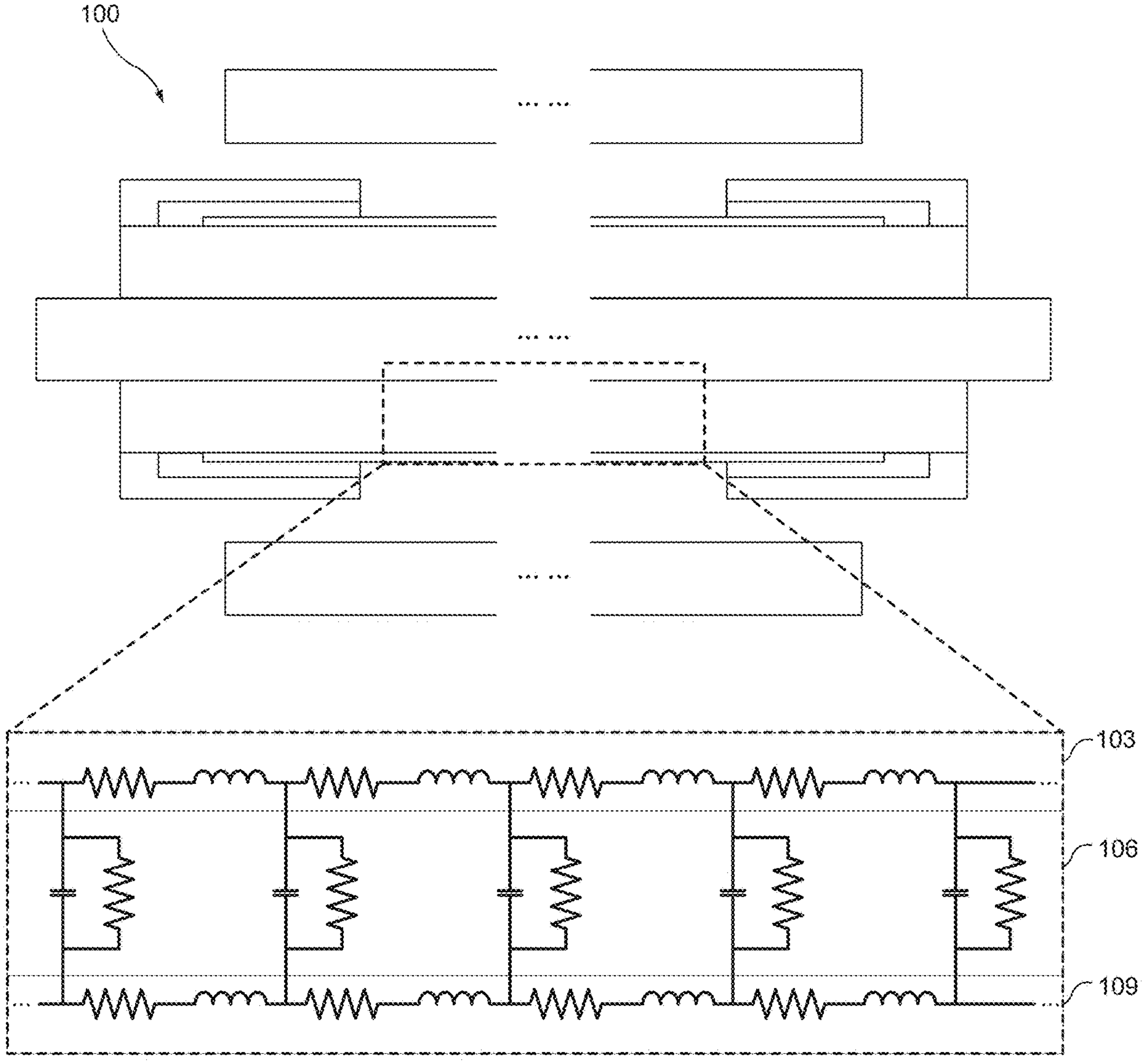
FIG. 7 illustrates an example of another approach for reducing displacement current in a single-turn inductor that uses a semi-conductive shielding layer model, according to various embodiments of the present disclosure.

FIG. 7 illustrates an example of another approach for reducing displacement current in the single-turn inductor 100 that uses a semi-conductive shielding layer model. The lumped external resistor 503 is converted to a distributed manner. In the semi-conductive shielding layer model, the shielding layer 109 can be a semi-conductive shielding layer 703, which can be regarded as a series connection of distributed grounding resistors. Although extra space for an external resistor may not be needed, the semi-conductive shielding layer model introduces an electrical potential on the shielding layer 109 as a function of both time and distance.

Figure 8:
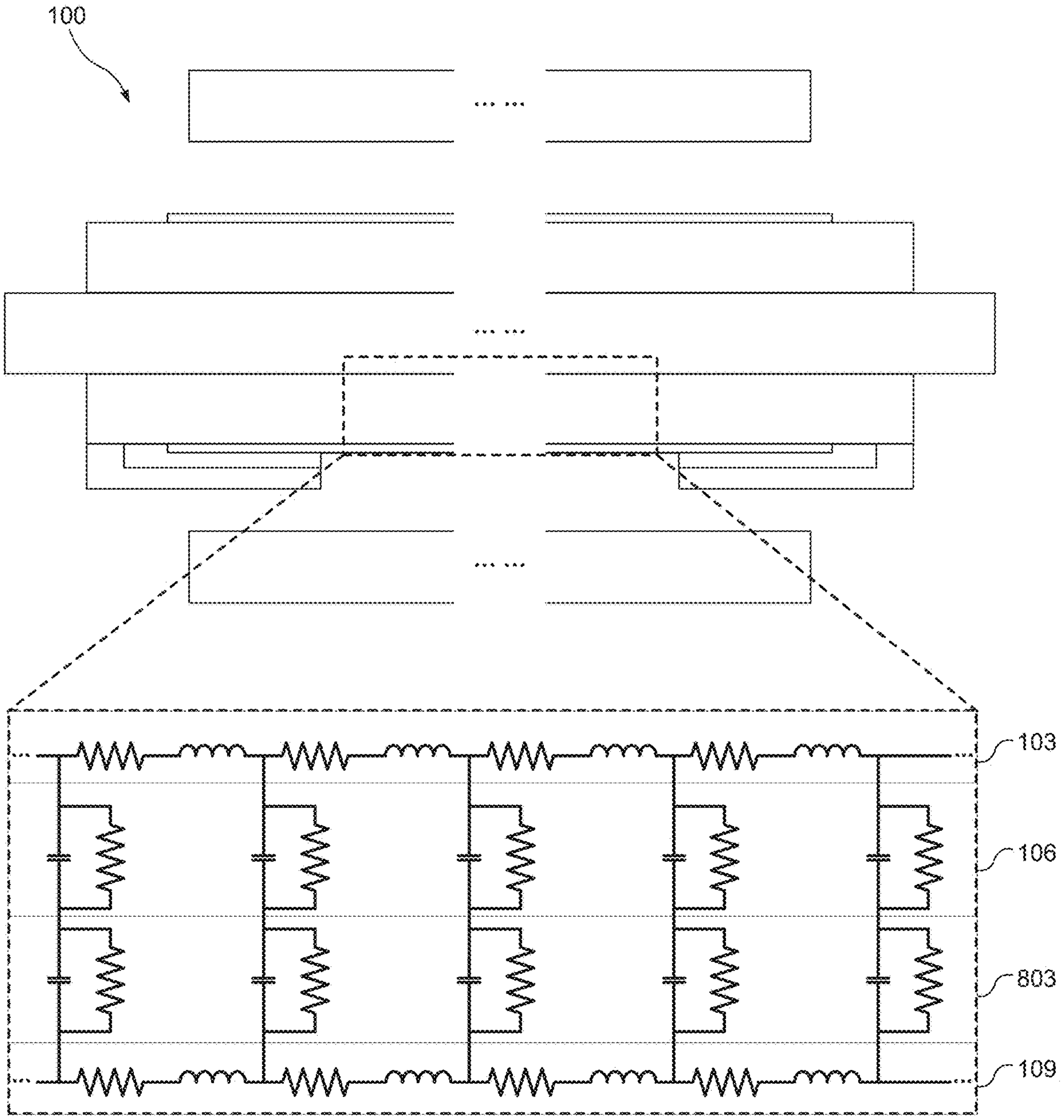
FIG. 8 illustrates an example of another approach for reducing displacement current in a single-turn inductor that uses a resistive layer and conductive shielding layer model, according to various embodiments of the present disclosure.

FIG. 8 illustrates an example of another approach for reducing displacement current in the single-turn inductor 100 using a resistive layer and conductive shielding layer model. The resistive layer and conductive shielding layer model includes a resistive layer 803 between the insulation layer 106 and a conductive shielding layer 109, which can be regarded as a parallel connection of distributed grounding resistor. Extra space may not be needed in the resistive layer and conductive shielding layer model, and the electrical potential on the shielding layer 109 may not change with time or distance.

Figure 9:
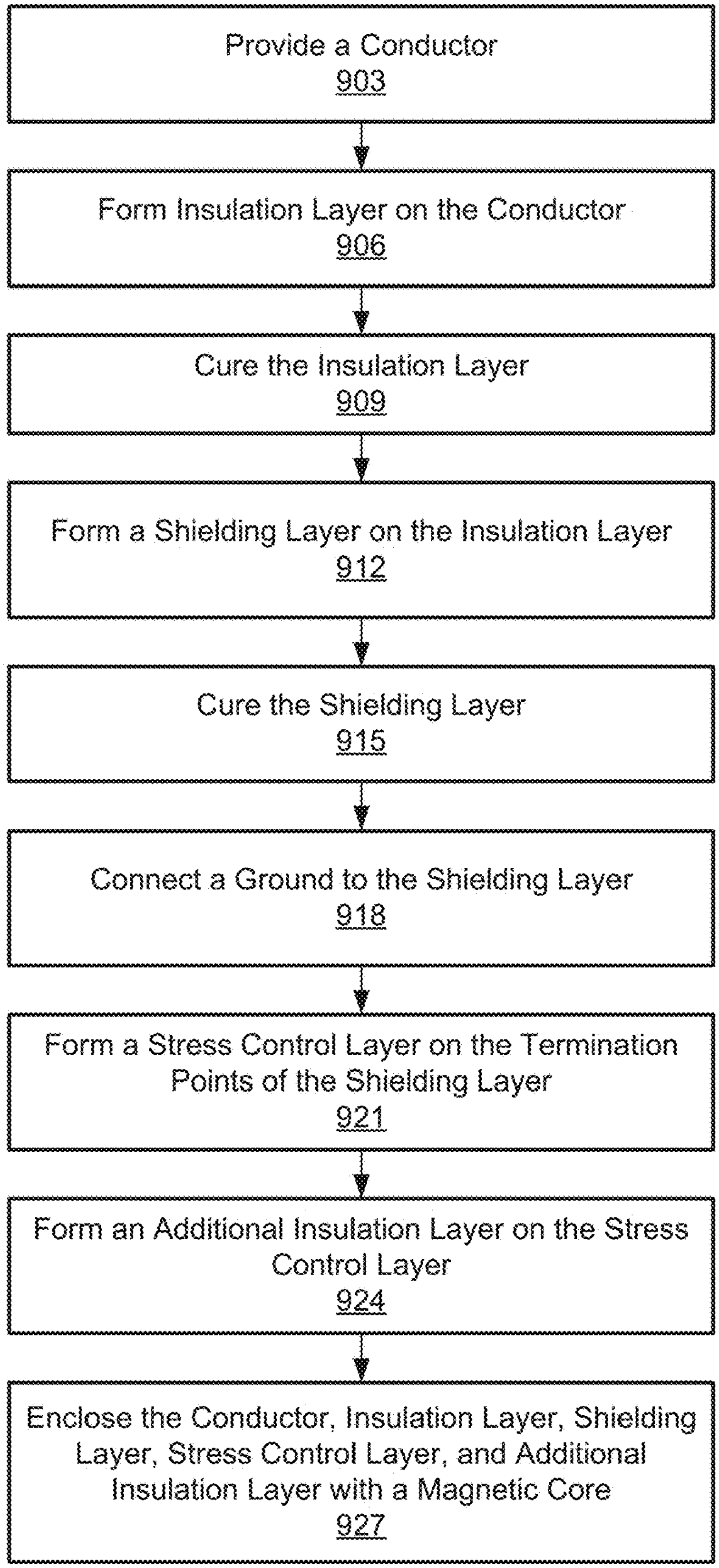
FIG. 9 illustrates a flow diagram of an example process for fabricating a single-turn inductor, according to various embodiments of the present disclosure.

FIG. 9 illustrates a flow diagram of an example process for fabricating a single-turn inductor 100. The process is described in connection with the single-turn inductor 100 shown in FIGS. 1-4, but other types of single-turn inductors can be formed using this process. Although the process diagrams show an order of operation, the order can differ from that which is shown. For example, in some cases the order of two or more process steps can be switched relative to the order shown. Two or more steps shown in succession can also be performed concurrently or with partial concurrence. Further, in some cases, one or more of the process steps can be skipped or omitted.

At reference numeral 903, a conductor 103 is provided. The conductor 103 can be, for example, a copper bar, Litz wire, or a copper braid. A copper bar can be relied upon in lower-frequency applications, Litz wire can be relied upon in higher-frequency applications, and a copper braid can be relied on in applications in which greater mechanical flexibility would be beneficial. Any suitable conductor with a high voltage potential and capable of carrying a high current can be provided, however.

At reference numeral 906, the insulation layer 106 is formed on the conductor 103. The insulation layer 106 can be formed by applying an insulator to an outer surface of the conductor 103. The insulator can be, for example, an insulating tape such as a mica tape saturated with a resin or other epoxy. In examples where the insulator is an insulating tape, the insulator can be wrapped around the conductor 103. The thickness of the insulation layer 106 can then be adjusted by increasing or decreasing the number of layers of the insulator that are wrapped around the conductor 103.

At reference numeral 909, the insulation layer 106 undergoes a curing process. To cure the insulation layer 106, the insulation layer 106 is first hot-pressed. In some examples, the insulation layer 106 can be hot-pressed at a temperature between about 160° C. and 170° C. for a time between about 45 minutes and 65 minutes. After being hot-pressed, the insulator is oven-cured. In some examples, the insulation layer 106 can be oven-cured at a temperature between about 160° C. and 170° C. for a time between about 12 hours and 16 hours. In examples where the insulator is a mica tape, when the insulation layer 106 is hot-pressed and oven-cured, the resin in the mica tape can become liquid and flow under the pressure and heat caused by the curing process. As the resin heats and becomes liquid, the liquid resin can fill space in the mica tape occupied by air bubbles. After the insulation layer 106 has been hot-pressed and oven-cured, the resin can then cure and become solid as the temperature of the mica tape decreases. Any suitable curing process that causes the single-turn inductor 100 to possess the qualities discussed herein can be used, however.

At reference numeral 912, a shielding layer 109 is formed on the insulation layer 106. A silver-coated copper conductive coating, for example, can applied to an outer surface of the insulation layer 106. The silver-coated copper conductive coating or other material can be in the form of an aerosol that is sprayed onto the outer surface of the insulation layer 106 to form the shielding layer 109. In some examples, the shielding layer 109 is formed only on a portion of the insulation layer 106. In examples that include a single-layer termination structure 300 or a double-layer termination structure 400, the shielding layer 109 can be formed on the insulation layer 106 so that there is sufficient surface area remaining on the insulation layer 106 to allow the stress control layer 303 and the additional insulation layer 403 to be formed on the insulation layer 106 as well.

At reference numeral 915, the shielding layer 109 undergoes a curing process. In some examples, the shielding layer 109 can be cured at a temperature of about 22° C. for about 24 hours. In other examples, the shielding layer 109 can be cured at a temperature of about 65° C. for about 30 minutes. Any suitable curing process that causes the shielding layer 109 to possess the properties discussed herein can be used, however.

At reference numeral 918, a ground 118 can be connected to the shielding layer 109. The ground can be, for example, a single-point grounding. In some examples, the ground 118 can also be connected to a magnetic core 112.

At reference numeral 921, a stress control layer 303 is formed on each termination 203 of the shielding layer 109. The stress control layer 303 can also be partially formed on an outer surface of the insulation layer 106. The stress control layer 303 can comprise a tape such as an electrical stress control tape.

At reference numeral 924, an additional insulation layer 403 can be formed on the stress control layer 303. The additional insulation layer 403 can also be partially formed on an outer surface of the insulation layer 106. The additional insulation layer 403 can, for example, comprise a tape such as a rubber mastic tape.

At reference numeral 927, at least a portion of the structure that includes the conductor 103, the insulation layer 106, the stress control layer 303, and the additional insulation layer 403 can be enclosed by a magnetic core 112. For example, this structure can be inserted into or passed through a window or other opening of the magnetic core 112. An air duct 115 can separate the magnetic core 112 and the shielding layer 109. In some examples, the shielding layer 109 can be completely enclosed by the magnetic core 112.

Figure 10:
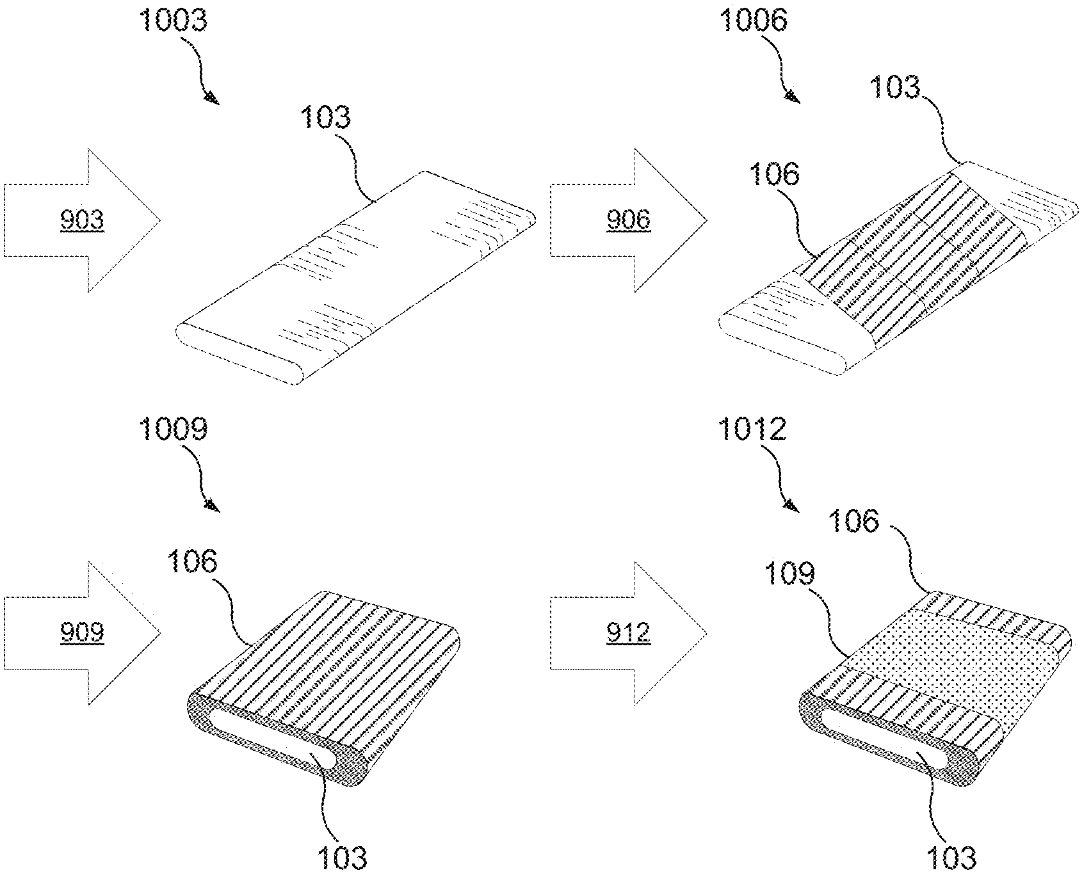
FIG. 10 illustrates an example of several components of a single-turn inductor during the fabrication process shown in FIG. 9, according to various embodiments of the present disclosure.

FIG. 10 illustrates an example of several components of a single-turn inductor 100 during the fabrication process illustrated in FIG. 9. Not all of the steps shown in FIG. 9 are shown in FIG. 10, however, and the components illustrated in FIG. 10 can be fabricated using any other suitable process. In addition, the components of a single-turn inductor 100 that are fabricated using the process illustrated in FIG. 9 can vary from those shown in FIG. 10 without departing from the concepts described herein.

At reference numeral 1003, an example of a conductor 103 provided at step 903 is shown. In this example, the conductor 103 is a copper bar. Then, at reference numeral 1006, the conductor 103 is shown wrapped in an insulator to form the insulation layer 106 as in step 906. Here, the insulator used to form the insulation layer 106 is a mica tape. Additional layers mica tape or other insulator may be further wrapped around the conductor 103 depending on the desired thickness of the insulation layer 106. Next, at reference numeral 1009, the insulation layer 106 is shown following the curing process in step 909. While the length of the conductor 103 is shown to be coextensive with the insulation layer 106, the conductor 103 may in some examples extend beyond one or both edges of the insulation layer 106. And at reference numeral 1012, the shielding layer 109 is shown formed on the insulation layer 106 following step 912. The shielding layer 109 is, in this example, formed from a silver-coated copper conductive coating, but any other suitable material can be used. The shielding layer 109 can in some examples cover a greater or lesser portion of the insulation layer 106 than is shown.

Figure 11:
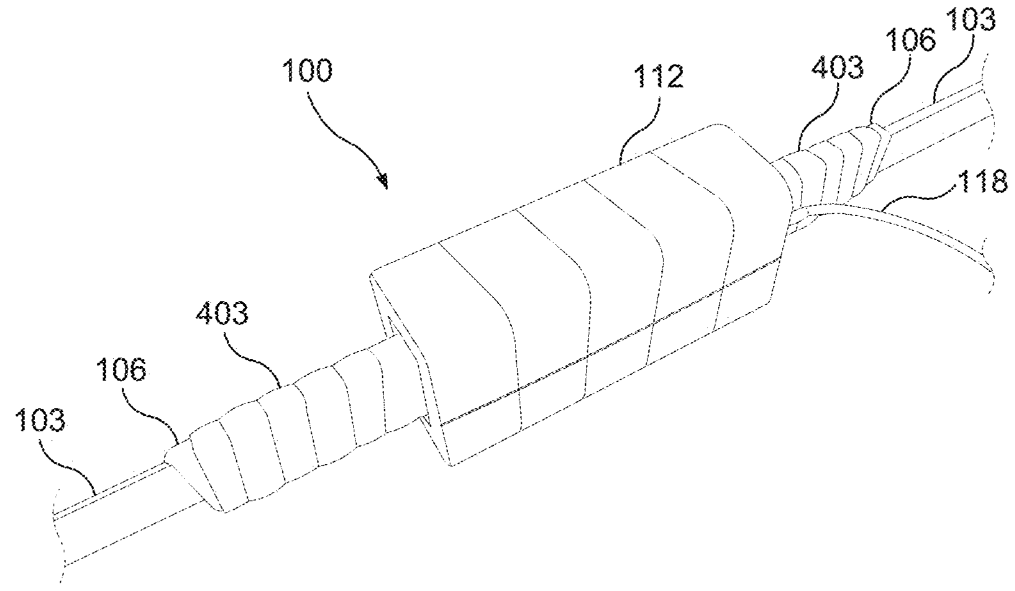
FIG. 11 illustrates an example of a single-turn inductor fabricated using the process shown in FIG. 9, according to various embodiments of the present disclosure.

FIG. 11 illustrates an example of a single-turn inductor 100 fabricated using the process described in FIG. 9. The single-turn inductor 100 can, however, be fabricated using other suitable processes. Likewise, a single-turn inductor 100 fabricated using the process described in FIG. 9 may vary from the single-turn inductor 100 shown in FIG. 11. In the example of FIG. 11, a copper bar is used for the conductor 103. The insulation layer 106 comprises resin-rich mica tape that is wrapped around a portion the copper bar conductor 103. The shielding layer 109 (not shown) is located inside the magnetic core 112 and covers a portion of the mica tape insulation layer 106. A ground 118 can be connected to both the shielding layer 109 and the magnetic core 112. The stress control layer 303 (not shown) can comprise an electrical stress control tape that is wrapped around the terminations 203 (not shown) of the shielding layer 109 and a portion of the mica tape insulation layer 106. The additional insulation layer 403 shown here is a rubber mastic tape that is wrapped around the electrical stress control tape of the stress control layer 303 and a portion of the mica tape insulation layer 106.

The single-turn inductor 100 shown in FIG. 11 is compact and can be used in medium-voltage, high-power, fast-switching-transient applications where high power density is needed. This design is also scalable to any voltage level and dV/dt level. The single-turn inductor 100 has a low inductance and can be used to limit circulating current between converters. Possible applications for the single-turn inductor 100 include, for example, electric ships, motor drives for underground mining, medium-voltage direct current distribution systems, wind turbine converters, and other similar applications.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A single-turn inductor, comprising:
- a conductor comprising a copper bar, a Litz wire, or a copper braid;
- a solid insulator enclosing at least a portion of the conductor;
- a shielding layer enclosing at least a portion of the solid insulator, the shielding layer comprising at least one termination, the shielding layer coupled to ground via a grounding path; and
- a magnetic core enclosing at least a portion of the shielding layer, where the grounding path does not pass between the shielding layer and the magnetic core.

2. The single-turn inductor of claim 1, wherein the shielding layer comprises a silver-coated copper conductive coating.

3. The single-turn inductor of claim 1, wherein the solid insulator comprises a resin-rich mica tape.

4. The single-turn inductor of claim 1, wherein a thickness of the solid insulator is based at least in part on an electric field distribution in the solid insulator.

5. The single-turn inductor of claim 1, further comprising an air duct between the shielding layer and the magnetic core.

6. The single-turn inductor of claim 1, wherein the shielding layer and the magnetic core have a same ground potential.

7. The single-turn inductor of claim 1, wherein the grounding path comprises a damping resistance.

* * * * *